US007369181B2

(12) United States Patent
Kang et al.

(10) Patent No.: US 7,369,181 B2
(45) Date of Patent: May 6, 2008

(54) METHOD OF REMOVING NOISE FROM DIGITAL MOVING PICTURE DATA

(75) Inventors: Moon-Gi Kang, Goyang-si (KR); Sung-Cheol Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 567 days.

(21) Appl. No.: 11/001,900

(22) Filed: Dec. 2, 2004

(65) Prior Publication Data
US 2005/0128355 A1    Jun. 16, 2005

(30) Foreign Application Priority Data
Dec. 11, 2003    (KR) ...................... 10-2003-0090032

(51) Int. Cl.
*H04N 5/21*        (2006.01)
(52) U.S. Cl. ...................... 348/606; 348/624; 348/630
(58) Field of Classification Search ................ 348/607, 348/606, 624, 625, 630; 382/260–266, 275; H04N 5/21, H04N 5/213
See application file for complete search history.

(56) References Cited

U.S. PATENT DOCUMENTS

| 4,745,458 | A | * | 5/1988 | Hirano et al. ............ 348/436.1 |
| 5,585,859 | A | * | 12/1996 | Ward et al. ................. 348/607 |
| 6,057,892 | A | | 5/2000 | Borer |
| 6,281,942 | B1 | | 8/2001 | Wang |
| 6,697,109 | B1 | * | 2/2004 | Daly .......................... 348/268 |
| 7,064,868 | B2 | * | 6/2006 | Kawano ...................... 382/199 |
| 2002/0118399 | A1 | | 8/2002 | Estevez et al. |

OTHER PUBLICATIONS

Song et al., "Edge-preserving noise filtering based on adaptive windowing", IEEE Trans. On Circuits and Systems, Aug. 1988, vol. 35, No. 8, pp. 1048-1055.

* cited by examiner

*Primary Examiner*—Sherrie Hsia
(74) *Attorney, Agent, or Firm*—F. Chau & Assoc. LLC (57) ABSTRACT

Provided is a method of removing noise from digital moving picture data reducing the number of frames used in a temporal filtering operation and able to detect motion between frames easily. The method comprises a method of spatial filtering, a method of temporal filtering, and a method of performing the spatial filtering and the temporal filtering sequentially. The spatial filtering method applies a spatial filtering in a YCbCr color space, preserving a contour/edge in the image in the spatial domain, and generating a weight that is adaptive to the noise for discriminating the contour/edge in the temporal filtering operation. The temporal filtering method applies temporal filtering based on motion detection and scene change detection, compensating for global motion, the motion detection considering the brightness difference and color difference of the pixels compared between frames in the temporal filtering operation, and a weight that is adaptive to the noise for detecting the motion in the temporal filtering operation. The spatial filtering method is preferably performed first, and the temporal filtering method is performed with the result of the spatial filtering.

21 Claims, 4 Drawing Sheets

METHOD OF REMOVING NOISE FROM DIGITAL MOVING PICTURE DATA

BACKGROUND OF THE INVENTION

This application claims the priority of Korean Patent Application No. 2003-90032, filed on Dec. 11, 2003, in the Korean Intellectual Property Office, the disclosure of which is incorporated herein in its entirety by reference.

1. Field of the Invention

The present invention relates to digitally encoding a moving picture, and more particularly, a method of removing noise in digital moving picture data.

2. Description of the Related Art

Since digital moving picture data takes up a large of data, the data should be compressed in order to be transmitted and stored efficiently. Thus technologies for improving the reproduced image quality of a video signal and improving data compression rate are essential for enhancing the competitiveness of related products. Compression algorithms such as moving picture experts group (MPEG)-2 have been adopted as compression methods in digital multimedia products requiring high definition, such as high definition TV (HDTV) and digital versatile discs (DVDs).

Due to the technical limits of practical image input systems, of transmission channels, and of transmitters and receivers that handle the moving picture data, noise is inevitably generated during the obtaining, transmitting and receiving of the moving picture data.

The noise can be defined as a set of pixels whose brightness changes abruptly in time and which are spatially distributed randomly (they do not form a set of meaningful geometrical shapes). Mosquito noise is a type of random noise that occurs along edges in images that have been compressed using DCT.

If we plot the intensity curve in temporal space, of the image brightness at a given spatial position, a noise pixel can be observed as an abrupt transition in the intensity curve. A straightforward approach to reduce noise is to use some kind of temporal averaging filtering techniques to remove these abrupt transitions. However, a fast moving pixel (e.g., part of a moving object in a scene) also shows a similar behavior to noise, i.e. the intensities of a fast moving pixel change very sharply during a short time period. Simple averaging techniques will result in a blur or even lost of the motion objects in the restored scene. Thus separating the motion effects from noise effects becomes a challenge.

In principle, three categories of pixels need to be dealt with: static pixels, moving pixels, and noisy pixels. A basic difficulty is to avoid treating moving pixels as noisy pixels. If motion estimation fails for fast motion pixels, such as the fast moving object in a scene, then it will incorrectly filter these pixels as if they were noise related. If we could correctly classify pixels into the three categories then we may be able to avoid some expensive computation (avoid motion estimation for static pixels) as well as improve the filtering.

The noise included (e.g., compressed) in an image (frame) sequence, (in the digital moving picture data), degrades the reproduction image quality and the compression rate because the noise is recognized as a (radio frequency) component of a signal. Noise increases the bandwidth required for digital representation of images. Since the noise is recognized also as data, the valid picture data must be compressed more in order to satisfy a given bit rate; however, further compression causes increased coding artifacts such as blocking artifacts.

The compression rate of the image sequence can be improved greatly and the image quality can be improved by compressing the data (according to the MPEG-2 method) after the noise is removed in advance using an effective noise reduction algorithm. There are conventional noise reduction algorithms such as spatial filtering, temporal filtering, and spatio-temporal filtering.

Because spatial filtering is based on a stationary model, a contour of the reproduced image cannot be preserved after noise is removed. Although an additional contour-adaptive filter may be used, such are not very effective in a case where a threshold for discriminating a contour line is fixed as a constant without regard to the degree of noise, or in a case where a color spot is generated. A color spot is generated because different characteristics of channels, which construct a color filter array (CFA) on a charge-coupled device (CCD) sensor, caused by different brightness are processed in the same way regardless of the brightness.

Although spatial filtering is an effective way of removing noise when a still image is processed. if a video image sequence is filtered using the spatial filtering method, the degree of noise removal can differ for each frame. The differences in the degree of noise removal can be represented as a flickering phenomenon when the video data is reproduced as a video image sequence. Thus, in order to improve the performances of the conventional spatial filtering process, the threshold value for determining the contour line according to noise energy (more specifically, noise energy variance) should adaptively change, and in order to remove the color spots and flickering phenomenon, a temporal filtering method is used in addition to the spatial filtering operation.

In temporal filtering, a motion compensation method is used. However, in order to take the motion compensation into consideration, the motion of a subject should be estimated for each frame, the filtering should be performed along a motion trace, and more calculation operations are additionally required to estimate the motion.

A temporal filtering method based on a motion detection algorithm has been used to reduce the error in motion compensation and to reduce calculation load. The efficiency of this temporal filtering based on a motion detection algorithm is largely dependent upon the robustness of the motion detection algorithm. However, since the motion in the color image is determined by brightness difference according to the typical motion detection algorithm, the algorithm cannot recognize motion indicated by color difference. Thus, when the brightness difference between the subject and background is not large enough, errors in detecting the motion may occur.

In order to solve the above problems, there is a method of detecting motion by detecting differences in magnitudes (brightness) and angles (color) of RGB vectors by consideration of vector characteristics of the color image. This method can be used regardless of the calculation load and memory capacity when an input signal of the system is an RGB signal or the algorithm is processed by software; however, there is a limit to this method's practicality when the algorithm is processed using hardware.

The YCbCr domain (hereinafter, referred to as the YCbCr color space) is the most commonly used color coordinate system as it is useful for compatibility with monochrome video and interoperability with professional video processing equipment. Luminance (Y) contains most of the spatial information to which the human eye accords importance due to its sensitivity to detail. The chrominance channels (Cb, Cr, blue-difference and red-difference respectively) add color information. Where most of the input signals are signals of such YCbCr form, input signals of YCbCr form have to be converted into RGB color space signals in order for the RGB vector calculation operation to be performed. In addition, since non-linear calculation is required to calculate an inverse function of a cosine or a sine function for calculating the difference of RGB vector angles (colors), the hardware's complexity increases.

When motion is detected using the differences in angles (color) of RGB vectors, it is difficult to set a threshold value to be used as a reference to discriminate the detected signals. The threshold value greatly affects the performance of filtering, and thus, if the threshold value is too large, an artifact such as a motional residual image can be generated, and if the threshold value is too small, the noise is not removed. For example, in the motion detection methods using the differences in angles (color) of the RGB vectors, when an input value of a cosine function is nearly 0 (zero), a difference between output values is small, and thus the threshold value should be set precisely down to decimal points to detect the movements effectively. In order to overcome the difficulties in determining the threshold value and remove the noise effectively, relatively large numbers of frames must be processed. Thus, a large capacity of memory is required, and the hardware complexity increased.

Besides the above problems, in the temporal filtering based on motion detection, a threshold value of motion detection should adaptively change according to scene detection. Otherwise, if a general sequence including scene data is processed using only motion detection, in a case where the brightness or the colors of the pixels included in adjacent frames of different scenes are similar to each other, the different scenes may be filtered and different scenes can be mixed in a filtered frame. Therefore, to improve the performances of conventional temporal filtering based on motion detection, a scene change detection algorithm should be additionally used.

The conventional spatio-temporal method of filtering combining the above two filtering methods is a way that expands the spatial filtering to the temporal domain. Although noise can be removed effectively, the method includes the limitations of both temporal filtering and spatial filtering.

SUMMARY OF THE INVENTION

The present invention provides a method of removing noise from digital moving picture data in a way that minimizes number of frames used in a temporal filtering process while motion can be easily detected.

In temporal filtering based on motion detection, a threshold value of motion detection should adaptively change according to scene (change) detection and according to the energy of noise included in the sequence. In order to remove the noise effectively, a small threshold value should be used when the energy of the noise is small, and a large threshold value should be used when the energy of the noise is large. In the YCbCr color space, the brightness/color motion threshold values should be determined adaptively to the noise energy without increasing the calculation load to reduce the number of frames required to perform the filtering process.

The disclosed method can be divided into spatial filtering and temporal filtering, and it is preferable that the spatial filtering is applied (to the input image) first and the temporal filtering is applied to the spatially filtered result.

According to an aspect of the present invention, there is provided a method of removing noise from digital moving picture data, wherein noise included in the digital moving picture data is removed through a spatial filtering operation, the method including: calculating a representative value in a $(2N+1) \times (2N+1)$ pixel local mask by performing a spatial filtering operation for color components of a pixel; and preserving edges of (in) an image by performing the spatial filtering operation for a brightness component of the pixel.

According to another aspect of the present invention, there is provided a method of removing noise from digital moving picture data, which performs a spatial filtering operation with respect to a brightness component Y and color components Cb and Cr of an image and then performs a temporal filtering operation with respect to the resultant values $x_y(i, j, n)$, $x_{Cb}(i, j, n)$ and $x_{Cr}(i, j, n)$ of the spatial filtering operation, the method including: detecting a scene change between frames; estimating a global motion (e.g., camera pan) between the frames and estimating a relative magnitude of noise $Var_{nT}$ on a temporal domain along with a global motion trace of each pixel; calculating a weight for detecting motion of the brightness component in the image and calculating a weight for detecting motion of the color components in the image; and performing a filtering operation based on scene detection/motion detection, the global motion of which is compensated, using some or all of a weight for filtering the frames within a range, which does not include a scene change, the relative magnitude of the noise, the weight for detecting the motion of the brightness component in the image, the weight for detecting the motion of the color components in the image, and a constant for normalizing.

According to still another aspect of the present invention, there is provided a method of removing noise from digital moving picture data, the method including: performing a spatial filtering operation for a brightness component and color components in each pixel; and performing a temporal filtering operation for the resultant data of the spatial filtering based on motion detection.

BRIEF DESCRIPTION OF THE DRAWINGS

The above and other features of the present invention will become more apparent by describing in detail exemplary embodiments thereof with reference to the attached drawings in which.

DETAILED DESCRIPTION OF PREFERRED EMBODIMENTS OF THE INVENTION

The attached drawings illustrate preferred embodiments of the present invention.

Hereinafter, the present invention will be described in detail by explaining preferred embodiments of the invention with reference to the attached drawings. Like reference numerals in the drawings denote like elements.

Figure 1:
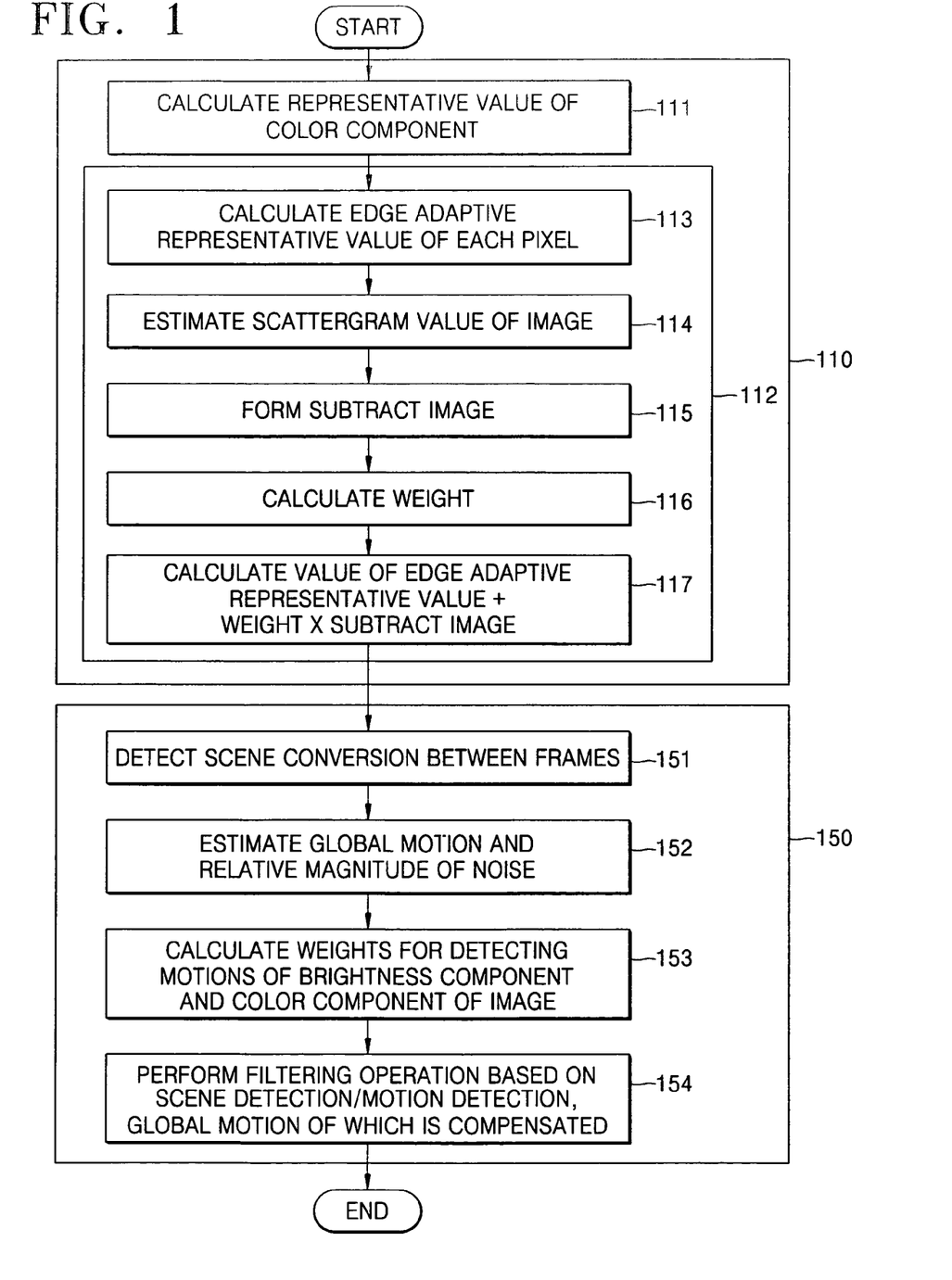
FIG. 1 is a flow chart describing a method of removing noise from digital moving picture data according to an embodiment of the present invention.

FIG. 1 is a flow chart illustrating a method of removing noise from digital moving picture data according to embodiments of the present invention.

Referring to FIG. 1, the method of removing noise from the digital moving picture data includes processing spatial filtering (110) in an embodiment of the present invention and processing temporal filtering (150) in another embodiment of the present invention. Another exemplary embodiment of the present invention uses the two steps (110 and 150) together.

According to an embodiment of the invention (a method of removing noise from the digital moving picture data), a filter based on a linear minimum mean square error (LMMSE) is used with respect to a brightness component (Y) of pixels in an input signal in a YCbCr format for conserving edges, and a low pass (LP) filter is used with respect to a color component (CbCr) of the input signal (for improving stability of images).

In step 111, calculating a representative value of the color components means that an average value or a central value of the color components is obtained. Thus, applying the low pass filter to the color components means that an average is calculated within a local mask (e.g., a (2N+1)×(2N+1) pixel region surrounding a given pixel).

There are five steps (substeps) of applying the LMMSE-based filter with respect to the brightness component 112.

In step 113, a representative value that is adaptive for an edge with respect to the brightness component of each pixel is calculated using a predetermined noise adaptive edge threshold value. Here, the representative value is the average value or the center value of each pixel (in a local mask), and the representative value adaptive to the edge is calculated using pixels located on one surface of the edge within a local mask.

The predetermined noise adaptive edge threshold value is not fixed constantly as in the conventional art, but varies adaptively depending on the amount of noise.

In step 114, a scattergram value of each pixel is estimated using a predetermined edge adaptive weight calculated using the noise adaptive threshold value and the edge adaptive representative value. The scattergram value means a variance or standard deviation, and a variance of pixels (signal activity) means the changed degree of the image or edge degree of the image.

In step 115, a subtraction image between the input image and the representative value of the image is calculated. The subtraction image includes the noise component and the edge component of the input image.

In step 116, a weight is calculated by comparing the scattergram value of the above image to the noise scattergram value.

In step 117, a relatively larger weight is applied to the edge component of the image and a smaller weight is applied to the noise component in the subtraction image, and the subtraction image, in which the weights are applied, is added to the edge adaptive representative value. The noise scattergram value is characterized by a noise variance and a noise standard deviation, and the noise variance denotes the degree of noise.

After processing the above five steps (steps 113 through 117) on a plane domain of the image, the filtering results may be approximately the same as the edge adaptive representative value, since the smaller weight is applied to the subtraction image on the plane domain of the image. In addition, on an edge domain of the image, the filtering results in the sum of edge adaptive representative value and the edge of the image, since a large weight is applied to the subtraction image on the edge domain of the image.

According to another embodiment of the present invention, the method 150 of removing noises from the digital moving picture data includes four steps (steps 151 through 154).

In step 151, a scene change between frames is detected.

In step 152, a global motion (e.g., camera pan) between frames is estimated, and the relative magnitude of the noise on the temporal domain is estimated (with compensation for global motion) along the global motion trace with respect to the each of the pixels.

In step 153, the motion is detected along the global motion trace (e.g., with compensation for global motion) with respect to the each of the pixels in the input image. In step 153, the brightness component Y and the color components (Cb and Cr) of the pixels of the input image are used simultaneously, and the motion threshold value that is adaptive to the noise is used to detect the motion. The weight that represents the detection of motion of brightness component in the image and the weight that represents the detection of motion of the color component in the image are calculated.

In step 154, the filtering based on the scene detection/motion detection, of which the global motion is compensated, is performed using all or some of the weight for filtering within a range (sequence) of frames including no scene change, the relative magnitude of the noise, the weight for detecting the motion of the brightness component in the image, the weight for detecting the motion based on the color components of pixels in the image, and a constant for normalizing the motion.

According to a preferred embodiment of the present invention, (a method of removing the noise from the digital moving picture data), the spatial filtering operation 110 is performed first, and the global motion compensated scene detection/motion detection based temporal filtering 150 is performed with respect to frames (for example, three frames) filtered by the above spatial filtering. According to a preferred embodiment, the spatial filtering is performed first, and the noise is thus removed to some degree, and then the motion detection that is required to perform the temporal filtering can be performed easily. Thus, it is desirable that the noise removal method according to a preferred embodiment is used to remove the noise.

In the method of removing noise according to an embodiment of the present invention, the edge in the brightness component of the moving picture data is maintained to increase the clarity of the color. The contour of edge in the image is maintained while removing the noise, and the color component is smoothed to improve the stability of the image.

Given that the spatial filtered values of the brightness component Y and of the color components Cb and Cr are $x_y(i,j,n), x_{Cb}(i,j,n)$, and $x_{Cr}(i,j,n)$ respectively, these spatial filtered values can be calculated by following equations:

$$x_Y(i, j, n) = \bar{y}_Y(i, j, n) + \frac{\sigma_{y_Y}(i, j, n)^2 - \sigma_n(i, j, n)^2}{\sigma_{y_Y}(i, j, n)^2} (y_Y(i, j, n) - \bar{y}_Y(i, j, n)) \quad (1)$$

-continued $$x_{Cb}(i, j, n) = \frac{1}{2N+1} \sum_{k=i-N}^{i+N} \sum_{l=j-N}^{j+N} y_{Cb}(k, l, n) \quad (2)$$

$$x_{Cr}(i, j, n) = \frac{1}{2N+1} \sum_{k=i-N}^{i+N} \sum_{l=j-N}^{j+N} y_{Cr}(k, l, n) \quad (3)$$

Here, N represents a magnitude of a (2N+1)×(2N+1) pixel local mask; i and j represents two-dimensional coordinates of the pixel; n represents a frame; $y_Y(i,j,n)$ denotes the Y component of a pixel of a noise-degraded image (i.e., of the input image); $\bar{y}_Y(i,j,n)$ is an average of $y_Y(i,j,n)$; $\sigma_{y_Y}(i,j,n)^2$ is a variance of $y_Y(i,j,n)$; $\sigma_n(i,j,n)^2$ is a variance of the noise; $y_{Cb}(k,l,n)$ is the Cb component of a pixel of the noise-degraded (input) image; and $y_{Cr}(k,l,n)$ is the Cr component of a pixel of the noise-degraded (input) image.

In the spatial filtering operation with respect to the brightness component Y in equation 1, since $\sigma_{y_Y}(i,j,n)^2 \approx \sigma_n(i,j,n)^2$ within a plane domain area of the noise-degraded image, the output of the filter is an average value (representative value) $\bar{y}_Y(i,j,n)$ of the noise-degraded (input) image; and since $\sigma_{y_Y}(i,j,n)^2 >> \sigma_n(i,j,n)^2$ with respect to the RF component of the noise-degraded (input) image, a predetermined weight component $(y_Y(i,j,n)-\bar{y}_Y(i,j,n))$ is added to the average value (representative value) of the noise-degraded (input) image to preserve the RF component of the image.

To make Equation 1 apply to fine components of the image, to Equation 1 can be adapted to compensate for the non-stationary characteristic of the moving picture. The average and variance of the noise-degraded (input) image are calculated as shown in the following Equation 4 and Equation 5, within a portion of the image that does not cross the contour/edge of the image within a (2N+1)×(2N+1) local mask area (here, it is assumed that the noise variance energy $\sigma_n(i,j,n)^2$ of Equation 1 is estimated or known):

$$\bar{y}_Y(i, j, n) = \frac{1}{\sum_{k=i-N}^{i+N} \sum_{l=j-N}^{j+N} W(k, l, n)} \sum_{k=i-N}^{i+N} \sum_{l=j-N}^{j+N} W(k, l, n) y_Y(i+k, j+l, n) \quad (4)$$

$$\sigma_{y_Y}(i, j, n)^2 = \frac{1}{\sum_{k=i-N}^{i+N} \sum_{l=j-N}^{j+N} W(k, l, n)} \sum_{k=i-N}^{i+N} \sum_{l=j-N}^{j+N} W(k, l, n) [y_Y(i+k, j+l, n) - \bar{y}_Y(i, j, n)]^2 \quad (5)$$

Here, W(k, l, n) is an edge-adaptive weight that determines whether the center pixel, which will be filtered, and peripheral pixels are in the same (plane) domain based on the edge. W(k, l, n) may be in inversely proportional to the brightness difference between the center pixel and a peripheral pixel. Thus, W(k, l, n) has a large value (e.g. =1) when the peripheral pixel and the center pixel are on the same (plane) domain based on the edge, and has a small value (e.g. ≈0) when the peripheral pixel and the center pixel are on a different (plane) domain based on the edge.

The edge-adaptive weight W(k, l, n) can be determined as shown in the following Equation 6:

$$W(k, l, n) = \begin{cases} 1, & \text{if } \Delta < \frac{f(\sigma_n^2)}{C} \\ \frac{-[\Delta - f(\sigma_n^2)]}{f(\sigma_n^2) - \frac{f(\sigma_n^2)}{C}}, & \frac{f(\sigma_n^2)}{C} \leq \Delta < f(\sigma_n^2) \\ 0, & \Delta \geq f(\sigma_n^2) \end{cases} \quad (6)$$

Here, $\Delta$ denotes the brightness difference between the center pixel and the peripheral pixel, and can be defined as $\Delta = g(|y_Y(i,j,n) - y_Y(i+k, j+l, n)|)$. The function $g(\bullet)$ is a monotone increasing function such as a linear function, an exponential function, or a logarithmic function; C is a constant that is one (1) or greater than one (1); and the noise adaptive edge threshold value $f(\bullet)$ is a monotone increasing function such as a linear function, an exponential function, or a logarithmic function.

$$\frac{f(\sigma_n^2)}{C}$$

and $f(\sigma_n^2)$ are the noise adaptive edge threshold values.

A minimum value (a desirable value in a case where there is little noise) and the maximum value (a desirable value in a case where there is a lot of noise) of the noise adaptive edge threshold value $f(\bullet)$ can be predetermined according to conventional knowledge, and the noise adaptive edge threshold value $f(\bullet)$ can be defined to be in proportion to the noise variance magnitude between the maximum value and the minimum value.

Figure 2:
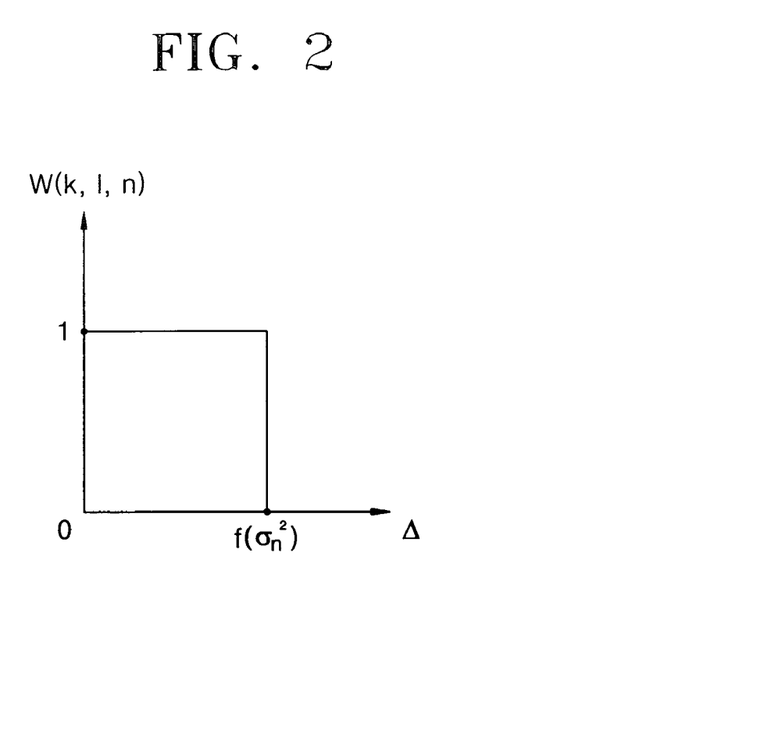
FIG. 2 is a graph illustrating a characteristic of an edge-adaptive weight W(k, l, n) when C=1 according to an embodiment of the present invention.

FIG. 2 is a graph illustrating a characteristic of the edge adaptive weight W(k, l, n) when constant C=1.

Figure 3:
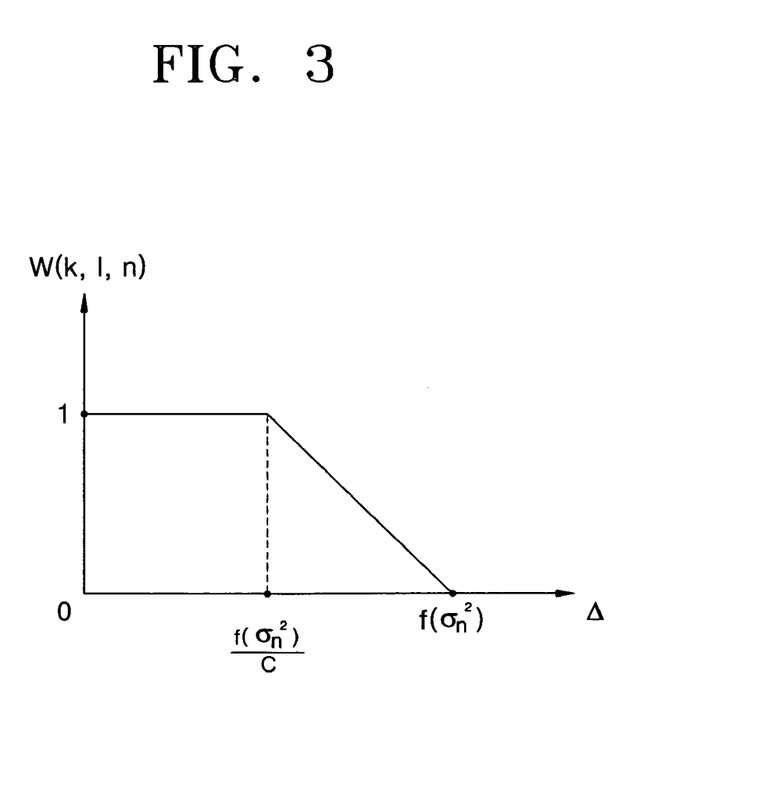
FIG. 3 is a graph illustrating a characteristic of the edge-adaptive weight W(k, l, n) when C≠1 according to an embodiment of the present invention.

FIG. 3 is a graph illustrating a characteristic of the edge adaptive weight W(k, l, n) when constant C≠1 (e.g., C>1).

Referring to FIGS. 2 and 3 respectively, when C equals 1, the weight W(k, l, n) can be either 1 or 0; and when C is larger than 1, the weight function W(k, l, n) can be considered to be linearly decreasing with increasing differences between the center pixel and the peripheral pixels. Also, the linear function between values $$\frac{f(\sigma_n^2)}{C}$$

and $f(\sigma_n^2)$ in FIG. 3 (which represents the characteristic of Equation 6) can be a monotone decreasing function in some cases.

Referring to Equations 4 through 6 and FIGS. 2 and 3, when a difference $\Delta$ between the center pixel and the peripheral pixel is the same as or greater than the noise adaptive threshold value $f(\sigma_n^2)$, the weight W (k, l, n) becomes 0 (zero), and thus the corresponding peripheral pixel is excluded when calculating the mean and variances. When the local means/variances are estimated using the weight W(k, l, n), the following adaptive characteristics are observable in the filtering operation:

In estimating the local mean, the pixels on an opposite side over the edge/contour, which are less related to the center pixel (such as, in a case where the difference $\Delta$ between the center pixel and the peripheral pixel is larger than the noise adaptive edge threshold value $f(\sigma_n^2)$), are not used; and only the peripheral pixels that are more related to the center pixel (such as, in a case where the pixels are within the same domain as the center pixel) are used, thus preventing a blurring effect from generating on the contour of a domain's edge. Since the noise components located on the domain's edge/contour having larger A value are excluded from the calculation, the noise components on the domain's edge/contour are not prominent in the reproduced image.

In Equation 6, the contour of the domain's edge is not decided from the constant threshold value but rather estimated from the noise variance function. If the contour of the edge is decided using the conventional method (e.g., wherein the noise adaptive edge threshold value f(•) is fixed as a certain constant), a lot of noise cannot be removed efficiently when the threshold value is set too small, and the fine components of the image cannot be preserved when the threshold value is set too large. However, according to the presently disclosed method of removing noises from the digital data of the present invention, since the edge threshold value f(•) is decided adaptively by determining the effective range of the noise (from the noise variance), robust results can be obtained in various environments.

Generally, the noise variance estimation algorithm has an error (difference) with respect to the actual image, and therefore, if the estimated noise variance value or the standard deviation value is used as the noise adaptive edge threshold value f(•), the threshold value may be set inappropriately. However, even though the noise variance estimation algorithm has an error, the relative magnitude of the noise can be determined exactly. Thus, when the minimum value and the maximum value of the noise adaptive edge threshold value f(•) are mapped on the function according to the relative magnitude of the noise as in the present invention, the threshold value f(•) can be reliably defined.

Thus, according to the present invention, the noise adaptive edge threshold value f(•) is defined using the function of noise variance in a given section, and thus the present invention can adapt to the error of the noise variance estimation algorithm better than a conventional method that defines the threshold value directly using the noise variance value or the standard deviation value.

Figure 4:
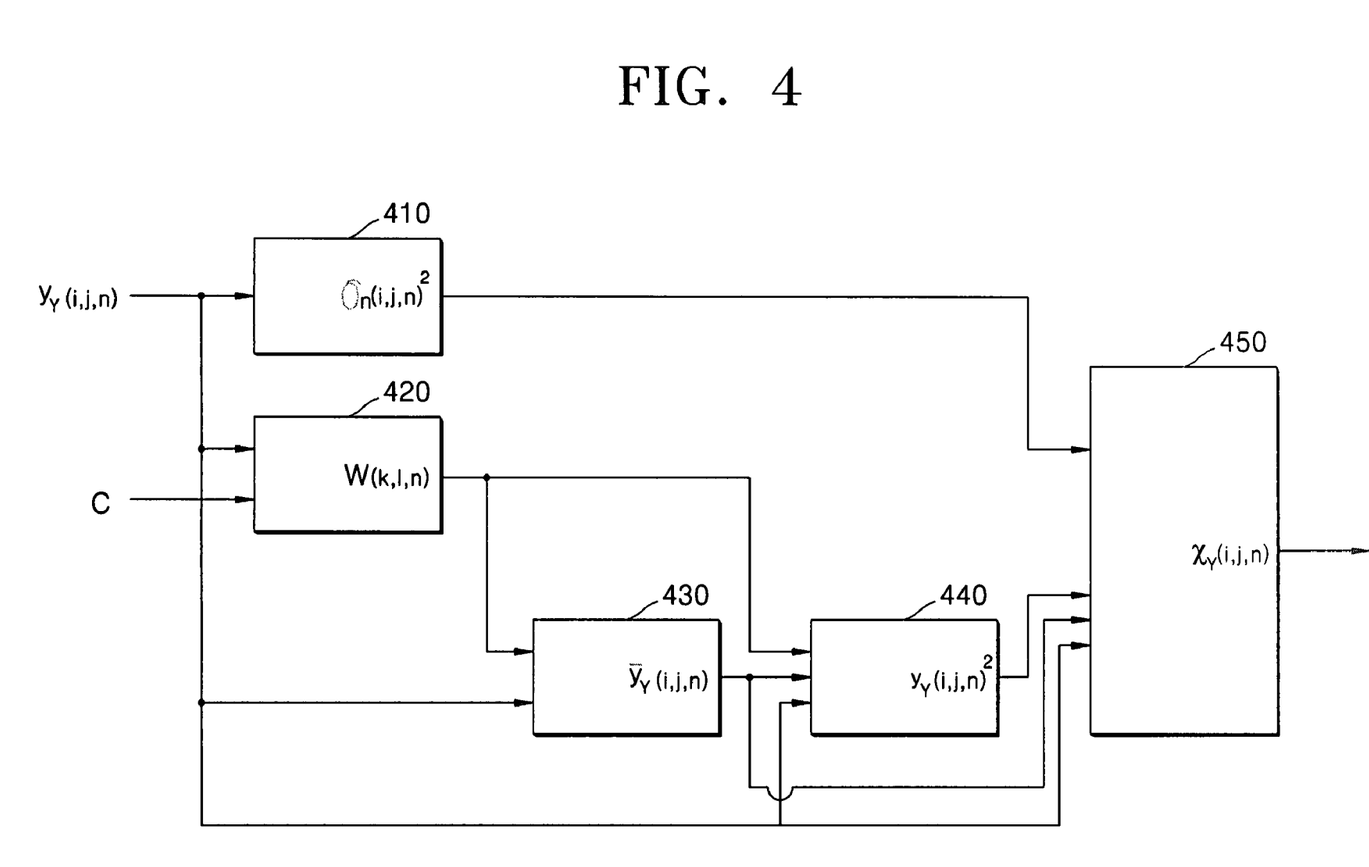
FIG. 4 is a block diagram illustrating inputs and outputs of calculations performed in each step included in the method of removing noise from the digital moving picture data according to an embodiment of the present invention.

FIG. 4 is a block diagram illustrating inputs and outputs of calculations performed in steps of the method of removing noise from the digital moving picture data according to an embodiment of the present invention. The symbol drawn within each block generally denotes the output of the block, and the arrow(s) pointing into each block generally indicates the inputs used to compute the output of the block.

Each step constituting the method of removing the noise from the digital moving picture data according to an embodiment of the present invention can be described in more detail with reference to FIG. 4.

Referring to FIG. 4, the method of removing noise from the digital moving picture data according to an embodiment of the present invention includes calculating the noise variance $\sigma_n(i,j,n)^2$ with respect to the Y component $\sigma_{y_Y}(i,j,n)^2$ of the noise-degraded (input) image (410); obtaining the edge adaptive weight W(k, l, n) that determines whether the center pixel, which will be filtered, and the peripheral pixels are within the same domain using a constant C with respect to the Y component $\sigma_{y_Y}(i,j,n)^2$ of the noise-degraded (input) image (420); calculating $\overline{Y}_Y(i,j,n)$ using the edge adaptive weight W(k, l, n) and $y_Y(i,j,n)$ (430); calculating the variance $\sigma_{y_Y}(i,j,n)^2$ using W(k, l, n), $y_Y(i,j,n)$ and $\overline{y}_Y(i,j,n)$ (440); and calculating the spatial filtered value $x_Y(i,j,n)$ of the brightness component Y of the moving picture using $y_Y(i,j,n)$, $\overline{y}_Y(i,j,n)$, $\sigma_n(i,j,n)^2$, and $\sigma_{y_Y}(i,j,n)^2$ (450).

The method of removing noise from the digital data according to another embodiment of the present invention is a temporal filtering operation based on motion detection and scene (change) detection in the YCbCr color space where the global motion is compensated for, and uses the frames (for example, three frames) that are compensated spatially. The method according to an embodiment of the present invention will be described as follows: It is detected whether there is scene change between the frames, which will be filtered temporally, and the scene (change) detection result is considered in the filtering operation; The global motion between the frames is estimated; The motion of the pixels is detected along the global motion trace; Then, the temporal filtering based on the motion detection is performed along the trace global motion trace in the frames having no scene change between them.

In the following description of the motion detection and the temporal filtering in the YCbCr color space will, it is assumed that the scene (change) detection and the global motion estimation have been performed previously:

The motion detection in the YCbCr color space that is adaptive to the noise energy will be explained. In the conventional motion detection algorithm, the threshold value that determines the brightness/color difference between the pixels caused by the motion of the pixels is fixed regardless of the amount of noise. Thus, if the threshold value is fixed, the threshold value has an excessively large value when the amount of noise is small, and thus generating artefacts. Conversely, the threshold value becomes too small when the amount of noise is large, and thus the noise cannot be removed efficiently.

Therefore, in the method of removing noise from the digital data according to the present invention, the amount of noise is estimated in the temporal domain, and the brightness weights and color weights that are used to detect the motion are adaptively changed according to the energy of the noise.

Assuming that the brightness component (Y) of the center pixel of the current frame that will be filtered is $x_Y(i,j,n)$ and the motion vector with respect to previous frame or next frame that is estimated relative to the global motion estimation is indicated by vertical and horizontal components $m_v$ and $m_h$, respectively, the relative magnitude of the noise in the temporal domain can be calculated by comparing the previous frame thereto and can be calculated as follows in Equation 7:

$$Var_{nT} = \frac{1}{\sum N_{ij}} \sum_{i,j} N_{ij} \times g[|x_Y(i,j,n) - x_Y(i-m_v, j-m_h, n-1)|] \quad (7)$$

Here, g[.] is a monotone increasing function, and $N_{ij}$ has a value of 1 when the value of $g[|x_Y(i,j,n)-x_Y(i-m_v, j-m_h, n-1)|]$ is larger than the threshold value nT tha can be set discretionarily by a person skilled in the art and has a value of 0 when the above value is smaller than the threshold value nT. Thus, Equation 7 is used to calculate the energy under an assumption that the difference value $g[|x_Y(i,j,n)-x_Y(i-m_v, j-m_h, n-1)|]$ of most of the motions in the noiseless image is larger than the threshold value nT.

The weight for detecting motion of the brightness component in the image becomes the reference value that determines whether the motion between the center pixel of the current frame which will be filtered and the corresponding pixel of the other frame is generated in the brightness domain. The weight for detecting the brightness component motion is inversely proportional to the brightness difference between pixels and has a value of 0 when the brightness difference between pixels is larger than a predetermined brightness motion threshold value. In addition, the brightness motion threshold value is determined by a function that is in proportion to the magnitude of the noise within a predetermined range that determines the motion in the brightness domain.

The weight for detecting motion of the color component in the image is the reference value that determines whether the motion between the center pixel of the current frame which will be filtered and the corresponding pixel of another frame is generated in the color domain. The weight for detecting the color component motion has a value of 0 when the color difference between the pixels is larger than a predetermined color motion threshold value. In addition, the color motion threshold value is determined by a function that is proportional to the magnitude of noise within a predetermined range that determines the motion of color component.

The edge adaptive weight $W_I(i, j, k)$ for detecting motion in the brightness domain can be determined as follows in Equation 8:

$$W_I(i, j, k) = \begin{cases} 1, & \text{if } \Delta_I \langle \frac{f_I(Var_{nT})}{C_I} \\ \frac{-[\Delta_I - f_I(Var_{nT})]}{f_I(Var_{nT}) - \frac{f_I(Var_{nT})}{C_I}}, & \frac{f_I(Var_{nT})}{C_I} \leq \Delta_I \leq f_I(Var_{nT}) \\ 0, & \Delta_I \rangle f_I(Var_{nT}) \end{cases} \quad (8)$$

Here, $\Delta_I$ that represents the brightness difference caused by the pixel motion and $\Delta_I = g[|x_Y(i,j,n) - x_Y(i - m_v, j - m_h, n - k)|]$; g(.) is a monotone increasing function such as a linear function, an exponential function, or a logarithmic function; $C_I$ is a constant that is larger than 1; and the brightness threshold value $f_I(.)$ is a monotone increasing function. In Equation 8, when the value of the adaptive motion detection weight $W_I(i, j, k)$ in the brightness domain is 0, it means that the motion of the brightness component Y of the corresponding pixel has been detected.

On the other hand, the weight $W_c(i, j, k)$ for detecting motion on the color domain can be represented as follows in Equation 9:

$$W_C(i, j, k) = \qquad (9)$$

$$\begin{cases} 1, & \text{if } \Delta_C \langle \frac{f_C(Var_{nT})}{C_C} \\ \frac{-[\Delta_C - f_C(Var_{nT})]}{f_C(Var_{nT}) - \frac{f_C(Var_{nT})}{C_C}}, & \frac{f_C(Var_{nT})}{C_C} \leq \Delta_C \leq f_C(Var_{nT}) \\ 0, & \Delta_C \rangle f_C(Var_{nT}) \end{cases}$$

Here, $\Delta_C$ that represents the color difference caused by the pixel motion and can be calculated as $\Delta_C = g[|x_{Cb}(i,j,n) - x_{Cb}(i - m_v, j - m_h, n - k)| + |x_{Cr}(i,j,n) - x_{Cr}(i - m_v, j - m_h, n - k)|]; g(.)$ is a monotone increasing function such as a linear function, an exponential function, or a logarithmic function; $C_c$ is a constant that is larger than 1; and the color threshold value $f_c(.)$ is a monotone increasing function. In Equation 9, when the value of the adaptive motion detection weight $W_c(i, j, k)$ in the color domain is 0, it means that the motion of the color components Cb and Cr of the corresponding pixel has been detected.

The weight functions in Equations 8 and 9 have basically the same shape as the waveform shown in FIG. 2, and the motion detection algorithm is also adaptive to the noise energy like the contour detection in the spatial filtering operation. Also, according to the conventional method, when the difference between the color components is detected using the RGB vector characteristic, inner product calculation and fraction calculation between vectors should be performed. However, the algorithm of the present invention can represent the color difference simply by $\Delta_C$. Also, the value of $\Delta_C$ in Equation 9 can be changed linearly according to the difference of colors, and it is easy to set the color detection threshold value.

The temporal filtering based on the motion detection and scene (change) detection in the YCbCr color space, where the global motion is compensated for, will now be described. In the conventional temporal filtering, the brightness components are filtered in most cases. The conventional method is effective when the amount of noise is not large; however, when the amount of noise is large and noise such as color spots is mixed in the color domain, the performance of removing noises is greatly reduced.

In the present invention, the YCbCr color space is filtered simultaneously based on the above scene change detection and motion detection algorithm.

$$\hat{x}_Y(i, j, n) = \frac{1}{Z_Y} \sum_k W_S(k) W_I(i, j, k) W_C(i, j, k) x_Y(i - m_{vk}, j - m_{hk}, k) \quad (10)$$

$$\hat{x}_{Cb}(i, j, n) = \qquad (11)$$
$$\frac{1}{Z_{Cb}} \sum_k W_S(k) W_I(i, j, k) W_C(i, j, k) x_{Cb}(i - m_{vk}, j - m_{hk}, k)$$

$$\hat{x}_{Cr}(i, j, n) = \qquad (12)$$
$$\frac{1}{Z_{Cr}} \sum_k W_S(k) W_I(i, j, k) W_C(i, j, k) x_{Cr}(i - m_{vk}, j - m_{hk}, k)$$

Here, $\hat{x}(\bullet)$ is the filter result of temporal filtering, and z is a constant for normalizing. Also, $m_{vk}$ and $m_{hk}$ are global motion vectors between n-th frame and k-th frame. In Equation 10, $W_s(k)$ is a weight for filtering the frames within a range where is no scene change, and $W_I(i, j, k)$ and $W_c(i, j, k)$ are motion detection weights defined by Equation 8 and Equation 9.

The weight $W_I(i, j, k)$ for detecting the motion of brightness component determines whether the brightness component motion is generated between a pixel of a frame, which will be filtered, and the pixel of another frame (of the previous frame or of the next frame). The weight $W_I(i, j, k)$ is inversely proportional to the brightness difference between the two pixels and has a value of 0 when the brightness difference between two pixels is larger than the brightness threshold value.

The brightness threshold value is determined by a function that is proportional to the noise magnitude in the temporal domain within a predetermined range, by which the motion indicated by the brightness difference can be determined.

The weight $W_c(i, j, k)$ for detecting the motion of the color component determines whether the color component motion is generated between a pixel of a current frame, which will be filtered, and the pixel of the previous frame or the next frame. The weight $W_c(i, j, k)$ is inversely proportional to the color difference between the two pixels, and has a value of 0 when the color difference between the two pixels is larger than the color threshold value.

The color threshold value is determined by a function that is in proportion to the noise magnitude on the temporal domain within a predetermined range, by which the motion indicated by the brightness difference can be determined.

If the scene change is detected at a certain frame of the filtering support, the frames after that frame including the scene change should be excluded from the filtering operation. In addition, if the motion is detected in a certain pixel of the frame, the pixels at the same positions in the next frames should be excluded from the filtering operation. Also, in some cases, $W_s(k)$ and the global motion vector may not be used in Equations 10 to 12, and one of $W_l$ and $W_c$ may not be used.

Figure 5:
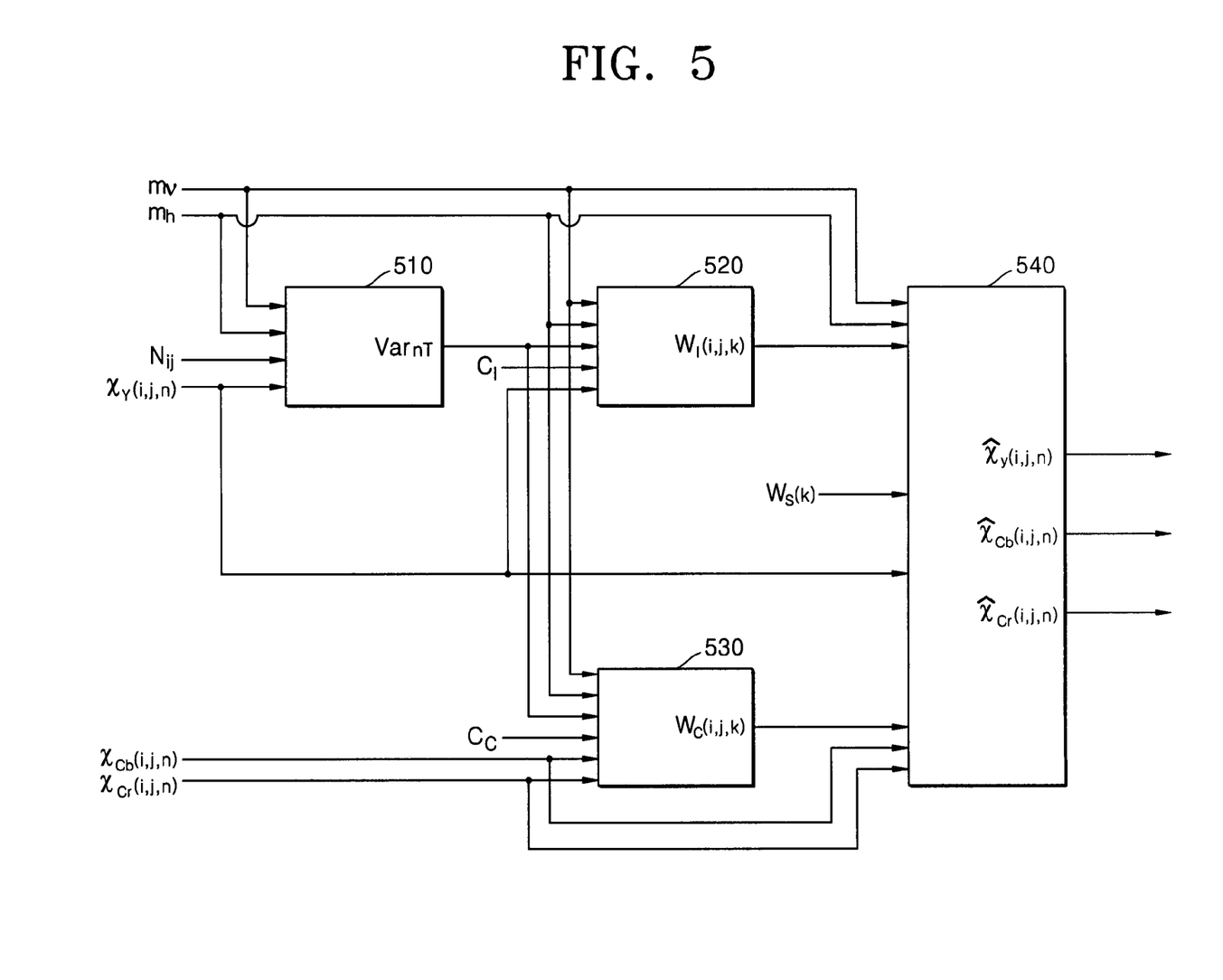
FIG. 5 is a block diagram illustrating inputs and outputs of calculations performed in each step included in the method of removing noise from the digital moving picture data according to another embodiment of the present invention.

FIG. 5 is a diagram illustrating inputs and outputs of calculations in the steps of the method of removing noises from the digital moving picture data according to another embodiment of the present invention. The symbol drawn within each block generally denotes the output of the block, and the arrow(s) pointing into each block generally indicates the inputs used to compute the output of the block.

Referring to FIG. 5, the method of removing the noise from the digital moving picture data according to another embodiment of the present invention includes estimating relative energy $Var_{nT}$ of noise in the temporal domain using a predetermined reference value $N_{ij}$ that is determined using $x_Y(i, j, n)$, which is a result of the (above) spatial filtering the brightness component Y of the center pixel, the global motion estimation vector components $m_v$ and $m_h$, and a threshold value nT (not shown), which can be set by a person skilled in the art according to the amount of noise in the moving picture (510); adaptively converting the weight $W_l(i, j, k)$ of the brightness component using the $Var_{nT}$, $x_Y(i, j, n)$, $m_v$ and $m_h$, and a predetermined constant $C_l$ (520); adaptively converting the weight $W_c(i, j, k)$ of the color component using $x_{Cb}(i, j, n)$ and $x_{Cr}(i, j, n)$, which are calculated by temporally filtering the color components Cb and Cr of the center pixel, $Var_{nT}$, $m_v$ and $m_h$, and a predetermined constant $C_c$ (530); and performing temporal filtering operation, which obtains the data $\hat{x}_Y(i,j,n),\hat{x}_{Cb}(i,j,n)$, and $\hat{x}_{Cr}(i,j,n)$, in which the global motion is compensated, using the $x_Y(i, j, n)$, $x_{Cb}(i, j, n)$, $X_{Cr}(i, j, n)$, $W_c(i, j, k)$, $W_l(i, j, k)$, $m_v$ and $m_h$, and the weight $W_s(k)$ for filtering the frames within a range (sequence) within which a scene change is not detected (540).

Although the spatial filtering or the temporal filtering of the present invention can be independently used to remove noise, an excellent noise removal effect can be obtained when the spatial filtering operation is first performed and then the temporal filtering operation is applied to the resultant data of the spatial filtering. The method of removing noise from the digital moving picture data according to a a preferred embodiment of the present invention uses the spatial filtering operation and the temporal filtering operation in sequence.

According to the method of removing noise from the digital moving picture data of the present invention, the number of frames used in the temporal filtering operation can be reduced and the motion detection can be performed more easily, and thus the method can be applied directly to various picture sensors such as CCDs and CMOS to obtain video images of high definition. Specifically, the method of the present invention can be used in pre-processing and post-processing for improving the image quality in a compression algorithm and to improve the image quality and data compression rate.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of removing noise from the digital moving picture data of an input image, wherein noise included in the digital moving picture data is removed through a spatial filtering operation, the method comprising:

performing a first spatial filtering operation upon the color components of pixels of the input image; and preserving edges in the input image by performing a second spatial filtering operation upon the brightness component of the pixels of the input image;

wherein a noise adaptive edge threshold value is used in the second spatial filtering operation to preserve edges in the input image.

2. The method of claim 1, wherein preserving edges comprises:

calculating an edge adaptive representative value of the pixels within a local mask by using the noise adaptive edge threshold value;

estimating a scattergram value of the image using a predetermined noise adaptive weight, which is generated using the noise adaptive edge threshold value and the edge adaptive representative value;

obtaining a subtract image between the edge adaptive representative value and the input image;

calculating a weight by comparing the scattergram value of the image to a scattergram value of the noise component; and granting a large weight to the edges of the image and a small weight to the noise of the image in the subtract image, and adding the subtract image, in which the weights are applied, to the edge adaptive representative value.

3. The method of claim 2, wherein the edge adaptive representative value is a mean value of the pixel, and the scattergram value is one of a variance and a standard deviation of the pixel.

4. The method of claim 2, wherein the edge adaptive representative value of the each pixel satisfies $$\overline{y}_Y(i, j, n) = \frac{1}{\sum_{k=i-N}^{i+N}\sum_{l=j-N}^{j+N} W(k, l, n)} \sum_{k=i-N}^{i+N}\sum_{l=j-N}^{j+N} W(k, l, n) y_Y(i+k, j+l, n),$$

where N is the magnitude of the local mask; i and j are second dimensional coordinates of the pixel; n represents a frame; $Yy(i, j, n)$ is the brightness component of the input image; and wherein W (k, l, n) is an edge adaptive weight used to determine whether the pixel at coordinates i and j, and peripheral pixels within the local mask are within the same domain based on the edge.

5. The method of claim 4, wherein edge adaptiVe weight W (k, l, n) is inversely proportional to the brightness difference between the center pixel at coordinates (i, j) and a peripheral pixel, and is equal to 0 when the brightness difference between the two pixels is larger than the noise adaptive edge threshold value; and wherein the noise adaptive edge threshold value is determined by a function that is proportional to the magnitude of noise within a predetermined range.

6. The method of claim 4, wherein the edge adaptive weight W(k, l, n) satisfies $$W(k, l, n) = \begin{cases} 1, & \text{if } \Delta \langle \frac{f(\sigma_n^2)}{C} \\ \frac{-[\Delta - f(\sigma_n^2)]}{f(\sigma_n^2) - \frac{f(\sigma_n^2)}{C}}, & \frac{f(\sigma_n^2)}{C} \leq \Delta \langle f(\sigma_n^2) \\ 0, & \Delta \geq f(\sigma_n^2) \end{cases}$$

where, $\Delta$ denotes the brightness difference between the pixel at coordinates (i, j) and a peripheral pixel and satisfies $\Delta = g(|y_Y(i,j,n) - y_Y(i+k, j+l, n)|)$; C is a constant that is 1 or greater than one; $g(\bullet)$ is a monotone increasing function; and the noise adaptive edge threshold value $f(\bullet)$ is a monotone increasing function.

7. The method of claim 2, wherein the scattergram value of the estimated image satisfies $$\sigma_{y_Y}(i, j, n)^2 = \frac{1}{\sum_{k=i-N}^{i+N}\sum_{l=j-N}^{j+N} W(k, l, n)} \sum_{k=i-N}^{i+N}\sum_{l=j-N}^{j+N} W(k, l, n)[y_Y(i+k, j+l, n) - \bar{y}_Y(i, j, n)]^2,$$

where N represents the magnitude of a local mask; i and j represent two-dimensional coordinates of the pixel; n represents a frame; $\sigma y_Y(i,j,n)^2$ is a variance of applying the edge adaptive weight W(k, l, n) with respect to $y_Y(i,j,n)$; W(k, l, n) is the edge adaptive weight;, and $\bar{y}_Y$, (i,j,n) is the edge adaptive representative value.

8. The method of claim 2, wherein the subtract image satisfies $y_Y(i, j, n) - \bar{y}_Y(i, j, n)$.

9. The method of claim 2, wherein the weight satisfies $$\frac{\sigma_{y_Y}(i, j, n)^2 - \sigma_n(i, j, n)^2}{\sigma_{y_Y}(i, j, n)^2}.$$

10. The method of claim 2, wherein the step of granting the weight to the subtract image satisfies $$\frac{\sigma_{y_Y}(i, j, n)^2 - \sigma_n(i, j, n)^2}{\sigma_{y_Y}(i, j, n)^2}(y_Y(i, j, n) - \bar{y}_Y(i, j, n)),$$

and the step of adding the subtract image to the edge adaptive representative value satisfies $$\bar{y}_Y(i, j, n) + \frac{\sigma_{y_Y}(i, j, n)^2 - \sigma_n(i, j, n)^2}{\sigma_{y_Y}(i, j, n)^2}(y_Y(i, j, n) - \bar{y}_Y(i, j, n)).$$

11. The method of claim 1, wherein performing the first spatial filtering operation includes calculating the representative value of the color components of the pixel, and representative values $X_{Cb}(i, j, n)$ and $X_{Cr}(i, j, n)$ of the color components Cb and Cr within the local mask satisfies $$x_{Cb}(i, j, n) = \frac{1}{2N+1}\sum_{k=i-N}^{i+N}\sum_{l=j-N}^{j+N} y_{Cb}(k, l, n)$$

$$x_{Cr}(i, j, n) = \frac{1}{2N+1}\sum_{k=i-N}^{i+N}\sum_{l=j-N}^{j+N} y_{Cr}(k, l, n),$$

where N is the magnitude of the local mask; i and j are second dimensional coordinates of the pixel; n represents a frame; $y_{Cb}(k, l, n)$ is a Cb component of the input image; and $Y_{Cr}(k, l, n)$ is a Cr component of the input image.

12. A method of removing noise from digital moving picture data, the method comprising:
performing a first spatial filtering operation upon the brightnes& components Y of pixels in an input image;
performing a second spatial filtering operation upon the color components Cb and Cr of the pixels in the input image;
performing a temporal filtering operation upon the respective resultant values $X_y(i, j, n)$, $X_{Cb}(i, j, n)$ and $X_{Cr}(i, j, n)$ of the spatial filtering operations;
detecting a scene change between frames; and
performing temporal filtering operation upon frames within a secjuence of frames that does not include the scene change, based upon motion detection with compensation for the global motion and using: the relative magnitude of the noise; a weight for detecting the motion of the brightness component in the image; a weight for detecting the motion of the color components in the image; and a constant for normalizing.

13. The method of claim 12 further comprising:
estimating a global motion between the frames;
estimating a relative magnitude of noise $Var_{nT}$ between temporally adjacent frames along a global motion trace of each pixel;
calculating a first weight ($W_f(i, j, k)$) for detecting motion of the brightness component of each pixel in the image; and
calculating a second weight ($W_c(i, j, k)$) for detecting motion of the color components of each pixel in the image.

14. The method of claim 13, wherein the relative magnitude of noise $Var_{nT}$ satisfies $$Var_{nT} = \frac{1}{\sum N_{ij}} \sum_{i,j} N_{ij} \times g[|x_Y(i, j, n) - x_Y(i - m_v, j - m_h, n - 1)|],$$

where, i and j are two-dimensional coordinates; n denotes a frame; $m_v$ and $m_h$ are global motion vector components; g[.] is a monotone increasing function; $N_{ij}$ has a value of 1 when the value of $g[|x_Y(i,j,n) - x_Y(i-m_v, j-m_h, n-1)|]$ is larger than the threshold value nT and has a value of 0 when the g value is smaller than the threshold value nT.

15. The method of claim 13, wherein the weight $W_f(i, j, k)$ for detecting the motion of the brightness component each pixel in the image satisfies $$W_I(i, j, k) = \begin{cases} 1, & \text{if } \Delta_I < \frac{f_I(\text{Var}_{nT})}{C_I} \\ \frac{-[\Delta_I - f_I(\text{Var}_{nT})]}{f_I(\text{Var}_{nT}) - \frac{f_I(\text{Var}_{nT})}{C_I}}, & \frac{f_I(\text{Var}_{nT})}{C_I} \leq \Delta_I \leq f_I(\text{Var}_{nT}), \\ 0, & \Delta_I > f_I(\text{Var}_{nT}) \end{cases}$$

and the weight $W_c(i, j, k)$ for detecting the motion of color component of each pixel in the image satisfies $$W_C(i, j, k) = \begin{cases} 1, & \text{if } \Delta_C < \frac{f_C(\text{Var}_{nT})}{C_C} \\ \frac{-[\Delta_C - f_C(\text{Var}_{nT})]}{f_C(\text{Var}_{nT}) - \frac{f_C(\text{Var}_{nT})}{C_C}}, & \frac{f_C(\text{Var}_{nT})}{C_C} \leq \Delta_C \leq f_C(\text{Var}_{nT}), \\ 0, & \Delta_C > f_C(\text{Var}_{nT}) \end{cases}$$

where, $\Delta_I = g[|x_Y(i,j,n) - x_Y(i-m_{vk}, j-m_{hk}, n-k)|]$, $\Delta_c = g[|x_{Cb}(i,j,n) - x_{Cb}(i-m_{vk}, j-m_{hk}, n-k)| + |x_{Cr}(i,j,n) - x_{Cr}(i-m_{vk}, j-m_{hk}, n-k)|]$, $g(.)$ is a discretionary monotone increasing function; $C_I$ and $C_c$ are constants that are larger than 1; and each of the brightness threshold value $f_1(.)$ and the color threshold value $f_c(.)$ are monotone increasing functions.

16. The method of claim 12, wherein the weight for detecting the motion of the brightness component is inversely proportion to the brightness difference between the pixels and is equal to 0 when the brightness difference is larger than a predetermined brightness motion threshold value that is determined by a function that is proportional to the magnitude of noise within a predetermined range; wherein the weight for detecting the motion of the color components is equal to 0 when the color difference between the pixels is larger than a predetermined color motion threshold value that is determined by a function that is proportional to the magnitude of noise within a predetermined range.

17. The method of claim 16, wherein the step of performing a temporal filtering operation satisfies $$\hat{x}_Y(i, j, n) = \frac{1}{Z_Y} \sum_k W_S(k) W_I(i, j, k) W_C(i, j, k) x_Y(i-m_{vk}, j-m_{hk}, k)$$

$$\hat{x}_{Cb}(i, j, n) = \frac{1}{Z_{Cb}} \sum_k W_S(k) W_I(i, j, k) W_C(i, j, k) x_{Cb}(i-m_{vk}, j-m_{hk}, k)$$

$$\hat{x}_{Cr}(i, j, n) = \frac{1}{Z_{Cr}} \sum_k W_S(k) W_I(i, j, k) W_C(i, j, k) x_{Cr}(i-m_{vk}, j-m_{hk}, k),$$

where, $\hat{x}(\cdot)$ is a result of temporal filtering; $W_s(k)$ is a weight for filtering the frames within a sequence of frames that does not include a scene change; $m_{vk}$ and $m_{hk}$ are global motion vector components between n-th frame and k-th frame; and z is the constant for normalizing.

18. A method of removing noise from digital moving picture data, the method comprising:
performing a first spatial filtering operation for a brightness component and color components of each pixel in each frame;
performing a second spatial filtering operation for the color components of each pixel including calculating a representative value of each pixel in each frame; and
detecting a scene change between frames; and
performing a temporal filtering operation, upon frames within a sequence of frames that does not include the scene change, based on motion detection for the resultant data of the first and second spatial filtering.

19. The method of claim 18, wherein the step of performing temporal filtering comprises:
estimating relative magnitude of noise by detecting motions along a global motion trace in each pixel;
calculating a weight for detecting motion of the brightness component of each pixel in the image;
calculating a weight for detecting motion of the color components of each pixel in the image; and
compensating for the global motion, using the relative magnitude of the noise, using a weight for detecting brightness component motion in the image, and using a weight for detecting color component motion in the image.

20. The method of claim 18, further comprising preserving the edges in the image by:
calculating an edge adaptive representative value of the each pixel using a predetermined noise adaptive edge threshold value;
estimating a scattergram value of the image using a predetermined noise adaptive weight, which is generated using the noise adaptive edge threshold value, and the edge adaptive representative value;
obtaining a subtract image, the edge adaptive representative value, and an input image;
calculating a weight by comparing the scattergram value of the image to scattergram value of the noise component and applying the weight to the subtract value; and
adding the subtract image, in which the weights are applied, to the edge adaptive representative value,
wherein the representative value is a mean value, and the scattergram value is a variance or a standard deviation.

21. The method of claim 20, wherein the scattergram value of the estimated image satisfies $$\sigma_{yY}(i, j, n)^2 = \frac{1}{\sum_{k=i-N}^{i+N} \sum_{l=j-N}^{j+N} W(k, l, n)} \sum_{k=i-N}^{i+N} \sum_{l=j-N}^{j+N} W(k, l, n)[y_Y(i+k, j+l, n) - \bar{y}_Y(i, j, n)]^2,$$

where N represents the magnitude of a local mask; i and j represent two-dimensional coordinates of the pixel; n represents a frame; $\sigma y_Y(i,j,n)^2$ is a variance of applying the edge adaptive weight $W(k, l, n)$ with respect to $y_Y(i,j,n)$; $W(k, l, n)$ is the edge adaptive weight; and $\bar{y}_Y(i, j, n)$ is the edge adaptive representative value.

* * * * *

UNITED STATES PATENT AND TRADEMARK OFFICE
CERTIFICATE OF CORRECTION

PATENT NO. : 7,369,181 B2  Page 1 of 1
APPLICATION NO. : 11/001900
DATED : May 6, 2008
INVENTOR(S) : Moon-Gi Kang and Sung-Cheol Park It is certified that error appears in the above-identified patent and that said Letters Patent is hereby corrected as shown below:

On the Title page, Item (73) should read

Assignee: Samsung Electronics Co., Ltd. and Education Foundation of Yonsei University.

Signed and Sealed this

Eighth Day of February, 2011

David J. Kappos
*Director of the United States Patent and Trademark Office*